May 18, 1943.    J. E. BUXTON    2,319,441
ENGINE STARTER
Filed Jan. 23, 1942

Witness:
Burr W. Jones

INVENTOR.
James E. Buxton
BY Clinton S. Janes
ATTY.

Patented May 18, 1943

2,319,441

UNITED STATES PATENT OFFICE 2,319,441

ENGINE STARTER

James E. Buxton, Elmira, N. Y., assignor to Bendix Aviation Corporation, South Bend, Ind., a corporation of Delaware Application January 23, 1942, Serial No. 427,959

3 Claims. (Cl. 74—7)

The present invention relates to an engine starter and more particularly to automatically engaging starter gearing incorporating a yielding driving element of elastically deformable material.

In those starter drives utilizing elastically deformable material such as rubber which is placed under compression during the operation of the drive it has been found that if, in such operation, the yielding member is compressed until it fills the entire space which it occupies, its yielding function is substantially lost, and the drive acts as though it were a solid mechanical connection. This is caused by the fact that the rubber itself is substantially incompressible, just as water, for instance, is incompressible, and is evidenced by a harsh thumping noise caused by the imposition of shock loads on the parts of the drive.

Moreover, if the elastically deformable material is subjected to peak torque loads at the time that it is compressed "solid," the engaging surfaces thereof are scrubbed and abraded so as to cause comparatively rapid deterioration of the yielding element.

It is an object of the present invention to provide a novel engine starter drive incorporating a yielding member of elastically deformable material which is arranged to limit the compression of said material to a point where it does not completely fill the space it occupies.

It is another object to provide such a device in which peak torque loads are taken by an auxiliary driving connection brought into operation by the compression of the elastically deformable material.

It is another object to provide such a device in which the means for limiting the compression of the elastically deformable material constitutes the auxiliary torque-transmitting means.

Further objects and advantages will be apparent from the following description taken in connection with the accompanying drawing, in which.

Figure 1:
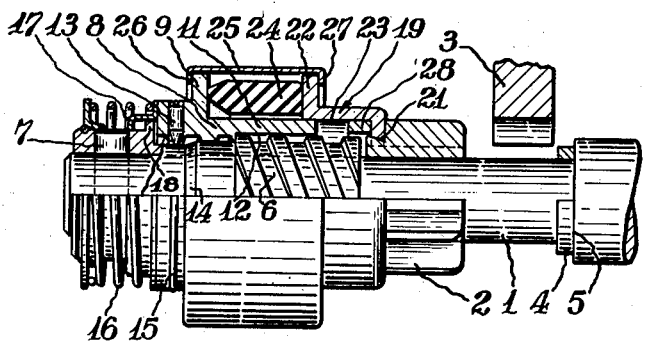
Fig. 1 is a side elevation partly broken away and in section of a preferred embodiment of the invention showing the parts in normal or idle position.

In Fig. 1 of the drawing there is illustrated a power shaft 1 which may be the extended armature shaft of a starting motor not illustrated. A pinion 2 is slidably journalled on the power shaft for movement into and out of engagement with a member such as a gear 3 of an engine to be started, the operative position of the pinion being defined by a thrust collar 4, seated against a shoulder 5 on the power shaft.

A screw shaft 6 is fixed on the power shaft as by means of a driving pin 7 and has threaded thereon a nut 8 having a radial flange 9 and a smooth cylindrical extension 11. The nut 8 is preferably counter-bored as indicated at 12 so as to enable the nut to run off the ends of the threads of the screw shaft, and the nut is normally maintained in idle position by means of an anti-drift pin 13 which cooperates with an inclined shoulder 14 on the screw shaft by means of a spring ring 15 seated in a groove of the nut and pressing the pin against the shaft.

A re-entry spring 16 is arranged to press the nut in a direction to engage its threads with the threads of the screw shaft, the expansion of said spring being limited by engagement of a thimble 17 with a flange 18 on the screw shaft.

Pinion 2 has a barrel 19 fixed thereon in any suitable manner as indicated at 21. Barrel 19 has a radial flange 22 similar to the flange 9 of nut 8, and is further provided with a cylindrical portion 23 adapted to have a loose bearing fit on the cylindrical portion 11 of the nut 8 so as to permit relative rotation and telescopic movement of the nut and barrel.

Figure 2:
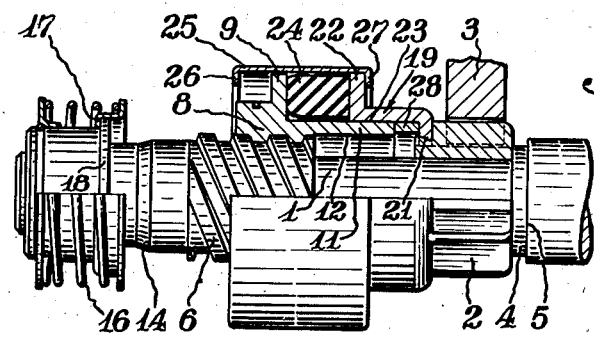
Fig. 2 is a similar view showing the parts in cranking position.

A cylindrical block 24 of elastically deformable material such as rubber is located between the flanges 9 and 22 of nut 8 and barrel 19 respectively, and is maintained in frictional engagement with said flanges by means of a sleeve 25 surrounding said flanges and spun over at its ends as indicated at 26 and 27, so as to limit the separation of the flanges. The chamber formed by the nut 8, flanges 9 and 22 and sleeve 25 is larger in volume than the elastic block 24, so that considerable endwise compression of the block may take place before the block will fill said chamber. According to the present invention means are provided for limiting the telescoping movement of the nut and barrel so as to prevent the elastic block from being compressed "solid" within its chamber. As here shown, this means is in the form of a clutch ring 28 of a suitable material such as fiber, seated in the barrel 19 in position to engage the end of the nut 8 and limit the telescoping movement of the nut and barrel as shown in Fig. 2. At the same time this clutch member is arranged to frictionally transmit torque directly from the driving member constituted by the nut 8 to the driven member constituted by the barrel 19, so as to relieve the elastic block from peak torque loads.

In the operation of the device, starting with the parts in the positions illustrated in Fig. 1, rotation of the power shaft 1 causes the screw shaft 6 fixed thereon to rotate and thereby traverse the nut 8 to the right, which traversal is transmitted through the elastic block 24 to the barrel 19 and pinion 2 to cause the pinion to mesh with the engine gear 3 until its longitudinal movement is arrested by the thrust ring 4. Further movement of the nut causes the elastic block 24 to be compressed between the driving flange 9 and driven flange 22, and at the same time torque is transmitted through the elastic frictional connection so formed. After a predetermined amount of such compression has taken place, the end of the nut 8 engages the clutch member 28 in the barrel, thus preventing further compression of the elastic block, and establishing an auxiliary frictional driving connection directly between the nut and barrel. This auxiliary connection is in effect a self-tightening friction clutch which transmits without shock the peak torque loads and prevents overloading of the elastic element 24.

When the engine starts, the overrunning of the engine gear causes the parts to be returned to their idle positions where they are maintained by means of the anti-drift pin 13.

Although but one embodiment of the invention has been shown and described in detail, it will be understood that other embodiments are possible and various changes may be made in the design and arrangement of the parts without departing from the spirit of the invention as defined in the claims appended hereto.

What is claimed is:

1. In an engine starter drive a power shaft, a pinion slidably journalled thereon, a stop on the power shaft defining the operative position of the pinion, a screw shaft fixed to the power shaft, a flanged barrel member fixed to the pinion, a flanged nut member on the screw shaft in telescopic relation with the barrel, a block of elastically deformable material interposed between the flanges of the barrel and nut and in frictional engagement therewith, and clutch means in the barrel limiting the telescopic movement of the nut into the barrel and forming an auxiliary frictional connection therebetween.

2. In an engine starter drive a power shaft, a pinion slidably journalled thereon, a stop on the power shaft defining the operative position of the pinion, a screw shaft fixed to the power shaft, a flanged barrel member fixed to the pinion, a flanged nut member on the screw shaft in telescopic relation with the barrel, a block of elastically deformable material interposed between the flanges of the barrel and nut and in frictional engagement therewith, and frictional clutch means in the barrel engageable by the end of the nut to limit the entry of the nut into the barrel and thereafter forming a frictional torque-transmitting connection between the nut and the barrel.

3. In an engine starter drive a power shaft, a pinion slidably journalled thereon for movement into and out of engagement with a member of an engine to be started, and a yielding driving connection between the shaft and pinion including driving and driven members, a block of elastically deformable material interposed therebetween, and torque-responsive means for compressing the block between said members, means cooperating with the driving and driven members to form a chamber for the block of elastically deformable material and means for stopping the compression of said block before it fills said chamber, said stopping means also forming a direct clutch connection between the driving and driven members.

JAMES E. BUXTON.